United States Patent Office 3,359,244
Patented Dec. 19, 1967

3,359,244
POLYURETHANES
Stephen Adamek, Islington, and Bertie B. J. Wood, Oakville, Ontario, Canada, assignors to Dunlop Rubber Company Limited, London, England, a company of Great Britain
No Drawing. Filed June 18, 1965, Ser. No. 465,176
Claims priority, application Great Britain, July 10, 1964, 28,470/64
5 Claims. (Cl. 260—77.5)

This invention relates to polyurethanes based on polymers of one or more episulphides and to a method for the preparation of such polyurethanes.

According to the present invention a polyurethane comprises the reaction product of a polymer of one or more episulphides having at least two terminal reactive groups at least one of which groups is a thiol group with an organic compound containing at least two terminal or substantially terminal —NCX groups wherein X represents an oxygen atom or a sulphur atom.

According to the present invention also, a method for the preparation of a polyurethane comprises mixing a polymer of one or more episulphides having at least two terminal reactive groups at least one of which groups is a thiol group with an organic compound containing at least two terminal or substantially terminal —NCX groups wherein X represents an oxygen atom or a sulphur atom, and allowing said polymer to react with said organic compound to form a polyurethane.

The polymer of one or more episulphides must contain at least two terminal reactive groups, at least one of which groups is a thiol group. The other groups which may be present in addition to the thiol group can be, for instance, hydroxyl groups or amino groups. Suitable polymers can be prepared by the method described in United States patent application Ser. No. 446,431 (assigned to the same assignee). In this co-pending patent application there is described a process for polymerizing episulphides which comprises contacting one or more episulphides with an anionic polymerization catalyst being a compound of a metal of Group IA of the Mendeleeff Periodic Table in the presence of a compound containing a labile hydrogen atom as a chain-transfer agent, to produce a low molecular weight polyepisulphide having terminal functional groups.

An alternative method for the preparation of a suitable polymer is described in United States patent application Ser. No. 463,016 (assigned to the same assignee) in which there is described and claimed a process for the preparation of a polymer which comprises polymerizing one or more episulphides in the presence of a polymerization catalyst being a compound of a metal of the B sub Group of Group II of the Mendeleeff Periodic Table, and a cocatalyst being ammonia, an inorganic ammonium compound, an organic amine, hydrazine or a derivative of hydrazine.

The polyepisulphides obtained by the methods of said United States patent applications (Ser. Nos. 446,431 and 463,016) have terminal functional groups at least one of which is a thiol group. The other group or groups will depend upon the cocatalyst employed in the preparation of the polymer and can be, for example, another thiol group, or an amino group. Preferably all the terminal reactive groups are thiol groups.

The polyepisulphides which can be used in the method of the present invention may have a molecular weight of up to, say 6,000, but it is preferred to use a polyepisulphide having a molecular weight of less than 3,500. Particularly good results are obtained using a polyepisulphide having a molecular weight in the range of from 350 to 2,000.

The polyurethanes of the present invention are produced by reacting the polyepisulphide having terminal reactive groups with an organic compound containing at least two terminal —NCX groups wherein X represents an atom of oxygen or sulphur. The organic compound can be a polyisocyanate or polyisothiocyanate and aliphatic, alicyclic or aromatic compounds can be used. Preferably, the organic compound is a diisocyanate and examples of suitable compounds are hexamethylene diisocyanate, dicyclohexylmethane diisocyanate, toluene diisocyanate, and the corresponding diisothiocyanates.

The polyurethanes of the present invention can be prepared simply by mixing the polyepisulphide having terminal functional groups with the organic polyisocyanate or polyisothiocyanate under anhydrous or substantially-anhydrous conditions and allowing the mixture to react to form a polyurethane. In this case it is usual to heat the resulting polyurethane to a temperature of from 100° C. to 180° C. to effect curing thereof. However, it is preferred to use a cure temperature of not greater than 150° C. since at higher temperatures the cured films tend to become discoloured.

Alternatively, the reaction product of the polyepisulphide having terminal functional groups and the organic polyisocyanate can be chain-extended to any desired molecular weight by the addition of a chain-extending agent, and/or cross-linked by the addition of a cross-linking agent. In this case, the polyurethane can be prepared by a "one-shot" process or by a "prepolymer" process. It is preferred to use a "prepolymer" process in which the polyepisulphide is reacted under anhydrous or substantially-anhydrous conditions with an excess of the organic polyisocyanate to form a polyurethane prepolymer having terminal —NCX groups wherein X represents an atom of oxygen or sulphur. The prepolymer so formed can then be chain-extended to any desired molecular weight by the addition of a chain-extending agent and/or cross-linked by the addition of a cross-linking agent. The chain-extending agent should contain two terminal hydroxyl or thiol groups and can be, for example, 1,4-butane diol.

The chain-extended prepolymer so formed contains terminal hydroxyl or thiol groups and can be cross-linked by the addition of a triisocyanate, or chain-extended further by the addition of a diisocyanate. The amount of the chain-extending agent used will usually be slightly in excess of the amount required to react with all the terminal reactive groups of the prepolymer, but a large excess may be used, if desired.

Alternatively, the prepolymer containing terminal —NCX groups can be cross-linked with very little chain-extension by adding a compound containing more than two terminal hydroxyl or thiol groups as a cross-linking agent. Suitable cross-linking agents are organic triols and trithiols, for example trimethylol propane.

Instead of a prepolymer process, a "one-shot" process can be used. In the "one-shot" process, the polyepisulphide and the polyisocyanate or polyisothiocyanate are reacted together in the presence of the chain-extending agent and/or the cross-linking agent. In both the prepolymer process and the one-shot process, the chain-extension and/or cross-linking reactions are preferably carried out in the presence of a catalyst, especially when an aliphatic diisocyanate is employed. The catalyst can be any one of the well-known "one-shot" catalysts, and can be ethylenediamine or its homologues and analogues, an alkyl or alkoxy metalloester of a fatty acid, especially dialkyl or dialkoxy tin diesters in which each alkyl or alkoxy group contains from 3 to 5 carbon atoms such as dibutyl or dibutoxy tin dilaurate, or a divalent tin soap such as stannous octoate. The amount of the catalyst added is not critical, and only a small amount is necessary; for instance 0.1 part by weight of catalyst per 100 parts of polyepisulphide is sufficient.

The reaction between the polyepisulphide and the polyisocyanate or polyisothiocyanate can conveniently be carried out at room temperature, but higher temperatures, for example, up to 100° C. can be used, if desired. In the prepolymer process, chain-extension and cross-linking of the prepolymer can also be carried out at room temperature or up to 150° C.

The reaction of the polyepisulphide with the polyisocyanate can be carried out in a solvent for the polyepisulphide. Suitable solvents are hydrocarbons such as toluene or xylene, and tetrahydrofurane. The amount of the solvent is not critical, and amounts of from 1 ml. to 10 mls. per gram of the polymer can be used.

The physical properties of the polyurethanes of the invention are similar to those of the corresponding cured polyepisulphides. The polyurethanes have a high resistance to attack by hydrocarbon solvents. The polyurethanes can be used as protective coatings and can be applied to the surface to be coated either directly or in solution in an organic solvent.

The invention is illustrated by the following examples:

EXAMPLE I

Into a clean reaction vessel were charged 40 mls. of diethyl ether, 1 gram of zinc oxide and 14 mls. of 30 percent aqueous ammonium hydroxide. The mixture was agitated and 22 mls. of propylene episulphide were added. The propylene episulphide was polymerized for 16 hours at 23° C., after which time the diethyl ether and any unreacted propylene episulphide were removed by evaporation under reduced pressure. The molecular weight of the polyepisulphide was determined by vapour phase osmometry.

The above procedure was repeated twice (Experiments 2 and 3) but using the amounts of ammonium hydroxide specified in Table I below. Three further experiments (Experiments 4, 5 and 6) were performed as above, except that the diethyl ether was excluded and the amount of ammonium hydroxide used was as shown in Table I, in which ETHER represents diethyl ether, PrS represents propylene episulphide and M.W. represents molecular weight.

TABLE I

| Expt. No. | ETHER | ZnO | NH₄OH | PrS | M.W. |
|---|---|---|---|---|---|
| 1 | 40 | 1 | 14 | 22 | 3,630 |
| 2 | 40 | 1 | 28 | 22 | 1,550 |
| 3 | 40 | 1 | 70 | 22 | 1,140 |
| 4 | | 1 | 14 | 22 | 2,910 |
| 5 | | 1 | 28 | 22 | 1,670 |
| 6 | | 1 | 70 | 22 | 1,200 |

The polyepisulphides so formed were converted to polyurethanes by the following procedures.

10 grams of the polymer from Experiment 1 were dried by heating at 100° C. under reduced pressure for 2 hours, after which time the temperature was reduced to 23° C. 4 grams of toluene diisocyanate were added and a rapid, exothermic reaction occurred to give a polyurethane. After 5 minutes a clear, hard polyurethane had been produced.

In an alternative procedure 10 grams of the polymer from Experiment 1 were dissolved in dry tetrahydrofurane and the solution was dried by heating at 100° C. under reduced pressure for 2 hours. The dried solution was cooled to 23° C. and 0.1 ml. of benzoyl chloride was added, followed by 4 grams of toluene diisocyanate. The mixture was immediately poured into a mould and the solvent was allowed to evaporate. The residue was heated at 110° C. for 10 minutes. A clear, hard, tough film was obtained. The above procedures were repeated with each of the polyepisulphides prepared in Experiments 2 to 6, and a clear hard polyurethane was obtained in each case.

EXAMPLE II

Polyepisulphides were prepared from propylene episulphide by the procedure given in Example I except that the catalysts and cocatalysts were charged as shown in Table II below and that water was used as the reaction medium. The amounts of each reagent are also shown in Table II, in which PrS represents propylene episulphide, EtS represents ethylene episulphide, BuS represents butylene episulphide, APrS represents allyloxypropyl episulphide and HyH represents hydrazine hydrate.

TABLE II

| Expt. No. | H₂O | ZnCO₃ (gm.) | NH₄OH (ml.) | PrS(ml.) | M.W. |
|---|---|---|---|---|---|
| 1 | 40 | 2.0 | 84 | 22 | 1,370 |
| 2 | 40 | 1.0 | 42 | 22 | 1,450 |
| 3 | 40 | 0.5 | 21 | 22 | 955 |
| | | CdCO₃ (gm.) | HyH (ml.) | | |
| 4 | 40 | 1.0 | 1.2 | 22 | 2,230 |
| 5 | 40 | 1.0 | 3.7 | 22 | 780 |
| 6 | 40 | 1.0 | 7.5 | 22 | 490 |
| 7 | | 1.0 | 1.2 | 22 | 2,780 |
| 8 | | 1.0 | 5.0 | 22 | 560 |
| | | | NH₄OH (ml.) | | |
| 9 | 25 | 0.5 | 25 | 25+EtS(5) | 700 |
| 10 | 25 | 1.0 | 25 | 25+BuS(5) | 1,200 |
| 11 | 25 | 1.0 | 25 | 25+APrS(5) | 700 |

The polyepisulphides from each of Experiments 1 to 11 were converted to polythiourethanes by both the procedures given in Example I. In each case, a clear, hard polyurethane was obtained.

EXAMPLE III

This example illustrates the preparation of polyurethane films from a low molecular weight polypropylene sulphide. The poly(propylene sulphide) had one amine end group and one thiol end group, and a molecular weight of 2,000.

A solution of 1 gm. of the polypropylene sulphide in tetrahydrofurane was rapidly mixed with 2 gms. of toluene diisocyanate, (Hylene, trademark). Considerable heat was evolved.

The mixture was cooled and then cast on to the surface of a thin, untreated, galvanized steel plate. The resulting film was dried by standing on the bench, and finally by baking at 140° C. in an air oven until cured.

The above procedure was repeated three times (Experiments 2, 3 and 4) using the amounts of reagents shown below in Table III. The procedure was again repeated twice (Experiments 5 and 6), except that the tetrahydrofurane was replaced by xylene in the amounts shown in Table III, in which P.PrS represents polypropylene episulphide, T.D. represents toluene diisocyanate and THF represents tetrahydrofurane.

TABLE III

| Expt. No. | P.PrS (gm.) | T.D. (gm.) | THF (gm.) | Xylene (gm.) |
|---|---|---|---|---|
| 1 | 1 | 2 | 3 | |
| 2 | 2 | 3 | 5 | |
| 3 | 2 | 2 | 4 | |
| 4 | 3 | 2 | 5 | |
| 5 | 2 | 3 | | 5 |
| 6 | 3 | 2 | | 5 |

The cure time was 3 hours at 140° C. The hardness (Pencil), flexibility and appearance of each cured film are shown in Table IIIA.

TABLE IIIA

| Expt. No. | Hardness | Flexibility | Appearance |
|---|---|---|---|
| 1 | 4H | Good | Clear, smooth. |
| 2 | 3H | do | Do. |
| 3 | 2H | Excellent | Do. |
| 4 | 3H | do | Do. |
| 5 | 3H | do | Do. |
| 6 | 2H | do | |

The polyurethane prepolymer solutions before baking (or curing) showed relatively long pot-lives depending upon dilution, moisture in the atmosphere and polymer-diisocyanate ratio. The sample from Experiment No. 1 had a potlife of 3 days at room temperature but the other samples retained fluid for several weeks at room temperature.

The solvent resistance of the cured film from Experiment No. 6 was immersed in (i) toluene for 5 hours and (ii) thiophene for 4 hours. The film was not softened or discoloured by either treatment.

The cured films from each experiment were also tested for caustic soda and salt spray resistance. No effect was noticed.

The impact resistance of the films and adhesion of the films to the metal surface were both acceptable.

EXAMPLE IV

This example illustrates the effect of the cure time on the properties of cured films.

The procedure outlined in Example III was repeated using a polypropylene sulphide of molecular weight 1000, having one amine end-group and one thiol end-group.

A solution of 2 gms. of the polypropylene sulphide in 3 gms. of tetrahydrofurane was rapidly mixed with 1 gm. of toluene diisocyanate (Hylene, trademark). Considerable heat was evolved.

The resulting composition was cast into a film as in Example III and the film was cured by heating it at 100° C. for 1 hour. The procedure was repeated (Experiments 2 to 4) but using the cure temperatures and cure times shown in Table IV below. The hardness (Pencil), flexibility and appearance of each film are also shown in Table IV.

The procedure was repeated sixteen times, but using the polypropylene sulphide, toluene diisocyanate and tetrahydrofurane in the following amounts.

| Expt. Nos. | Polymer (gms.) | T.D. (gms.) | THF (gms.) |
|---|---|---|---|
| 5-8 | 3 | 2 | 5 |
| 9-12 | 2 | 2 | 4 |
| 13-16 | 2 | 3 | 5 |
| 17-20 | 1 | 2 | 3 |

TABLE IV

| Expt. Nos. | Time (hrs.) | Temp. (° C.) | Hardness | Flexibility | Appearance |
|---|---|---|---|---|---|
| 1 | 1 | 100 | Soft | Excellent | Clear. |
| 2 | 3.5 | 100 | do | do | Do. |
| 3 | 1 | 130 | do | do | Do. |
| 4 | 2 | 160 | do | do | (*) |
| 5 | 1 | 100 | do | do | Clear. |
| 6 | 3.5 | 100 | 2H | Good | Do. |
| 7 | 1 | 130 | 2H | do | Do. |
| 8 | 2 | 160 | 2H | do | (*) |
| 9 | 1 | 100 | Soft | Excellent | Clear. |
| 10 | 3.5 | 100 | 2H | Good | Do. |
| 11 | 1 | 130 | 2H | do | Do. |
| 12 | 2 | 160 | 2H | do | (*) |
| 13 | 1 | 100 | Soft | Excellent | Clear. |
| 14 | 3.5 | 100 | 2H | Good | Do. |
| 15 | 1 | 130 | 2H | do | Do. |
| 16 | 2 | 160 | 3H | do | (*) |
| 17 | 1 | 100 | Soft | Excellent | Clear. |
| 18 | 3.5 | 100 | 2H | Good | Do. |
| 19 | 1 | 130 | 3H | do | Do. |
| 20 | 2 | 160 | 5H | do | (*) |

*Indicates that the film was slightly discoloured.

It can be readily seen that, with the compositions used, air-curing at 100° C. is slow unless catalysts are used. 125° C. to 140° C. appears to be an adequate temperature for obtaining a complete cure in a reasonable time, while higher temperatures result in the film having a slight yellow colour.

Films cured at 100° C. were slightly softened by immersion in toluene for 2 hours, while films cured at higher temperatures, showed no noticeable affect on being immersed in toluene or thiophene for several hours.

EXAMPLE V

This example illustrates the effect of varying the ratio of the polymer to the diisocyanate and the effect of the molecular weight of the polymer on the properties of the cured films.

The procedure outlined in Example II was repeated. The ingredients and physical properties of the films are shown below:

TABLE V

| Expt. No. | Reagents (gms.) | | | |
|---|---|---|---|---|
| | PPrS (1,000 M.W.) | PPrS (2,000 M.W.) | T.D. | THF |
| 1 | 3 | | 1 | 4 |
| 2 | 4 | | 1 | 5 |
| 3 | 2 | | 2 | 4 |
| 4 | | 2 | 2 | 4 |

TABLE VA

| Expt. No. | Properties | |
|---|---|---|
| | Hardness | Appearance |
| 1 | Soft | Flexible, clear. |
| 2 | Soft (softer than Expt. 1) | Do. |
| 3 | 3H | Do. |
| 4 | 3H | Do. |

It can be seen that by reacting up to 4 parts by weight of the polymer to 1 part of the diisocyanate a tough flexible film can be obtained. Hardness, of course, is lower with higher amounts of polymer in the composition.

Equally good films may be obtained using a higher molecular weight polymer. The hardness appears to be substantially the same for the films from Experiments 3 and 4, whereas the flexibility is improved when the higher molecular weight of polymer is used.

Having now described our invention what we claim is:

1. A polyurethane which comprises the reaction product of a polymer of at least one vicinal episulphide produced by polymerizing at least one episulphide produced under anhydrous conditions and in the presence of a catalyst selected from the group consisting of (a) an anionic compound of a metal of Group IA of the Mendeleef Periodic Table in the presence of a compound containing a labile hydrogen atom and (b) a compound of a metal of the B sub Group of Group II of the Mendeleef Periodic Table, and a cocatalyst of the group consisting of ammonia, an inorganic ammonium compound, an organic amine, a hydrazine and a derivative of hydrazine, said polymer having a molecular weight between 350 and 6000 and having at least two terminal groups each having an active hydrogen atom, at least one of said terminal groups being a thio group, under anhydrous conditions with an organic compound containing at least two terminal —NCX groups wherein X represents an atom of oxygen or sulphur under anhydrous conditions.

2. The polyurethane of claim 1 in which the molecular weight of the polymer of at least one vicinal episulphide is from 350 to 2000.

3. The polyurethane of claim 1 in which said organic compound containing at least two terminal —NCX groups is selected from the group consisting of organic diisocyanates and diisothiocyanates.

4. The polyurethane of claim 1 in which the reaction product of the polymer is formed by reaction of polyepisulphide with an excess of organic polyisocyanate to form a polyurethane prepolymer having terminal —NCX groups and in which the reaction product is chain extended by an organic compound having two hydroxyl groups.

5. The polyurethane of claim 4 which is cross-linked by adding a compound ocntaining more than two terminal hydroxyl groups as a cross-linking agent.

References Cited

UNITED STATES PATENTS

| 2,814,600 | 11/1957 | Mitchell | 260—79.1 |
| 2,962,457 | 11/1960 | Mac Kinney | 260—327 |
| 3,016,365 | 1/1962 | Holtschmidt | 260—79 |
| 3,114,734 | 12/1963 | Gobran et al. | 260—79 |
| 3,222,326 | 12/1965 | Brodoway | 260—79 |

FOREIGN PATENTS

| 702,315 | 1/1965 | Canada. |
| 793,780 | 4/1958 | Great Britain. |

DONALD E. CZAJA, *Primary Examiner.*

LEON J. BERCOVITZ, *Examiner.*

M. I. MARQUIS, *Assistant Examiner.*